United States Patent
Nagano et al.

(10) Patent No.: US 8,960,011 B2
(45) Date of Patent: Feb. 24, 2015

(54) WHEEL OPERATING FORCE SENSOR

(71) Applicant: Fuji Jukogyo Kabushiki Kaisha, Tokyo (JP)

(72) Inventors: Hiroki Nagano, Tokyo (JP); Hiroshi Shimoyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/175,796

(22) Filed: Feb. 7, 2014

(65) Prior Publication Data

US 2014/0245838 A1   Sep. 4, 2014

(30) Foreign Application Priority Data

Mar. 1, 2013   (JP) .................................. 2013-040295

(51) Int. Cl.
    *G01B 7/16*   (2006.01)
    *G01L 1/00*   (2006.01)
(52) U.S. Cl.
    CPC ..................................... *G01L 1/005* (2013.01)
    USPC ................... 73/767; 73/763; 73/760
(58) Field of Classification Search
    USPC ........................................... 73/767, 763, 760
    See application file for complete search history.

(56) References Cited

U.S. PATENT DOCUMENTS 5,864,056 A * 1/1999 Bell et al. .................... 73/146

FOREIGN PATENT DOCUMENTS

JP   S61-079129 A   4/1986

\* cited by examiner

*Primary Examiner* — Lisa Caputo
*Assistant Examiner* — Jamel Williams
(74) *Attorney, Agent, or Firm* — McGinn IP Law Group, PLLC

(57) ABSTRACT

A wheel operating force sensor includes: an attachment fixed to a vehicle body member supported by a suspension device; a hub to which a wheel is fixed and which is rotatably supported about a wheel axis with respect to the attachment; a sensing body having a tube formed substantially concentrically with the wheel axis, one end of the tube being fixed to the attachment, and the other end being connected to the hub, with a hub bearing being interposed between the other end and the hub; and a component force sensing unit having a bridge circuit including per component force at least four strain gauges that are provided on a circumferential surface of the tube of the sensing body. The hub bearing has: a radial bearing provided between the sensing body and the hub and receiving a load in a radial direction; and a thrust bearing provided between the sensing body and the hub and receiving a load in a thrust direction, and moreover provided separately from the radial bearing.

18 Claims, 5 Drawing Sheets

WHEEL OPERATING FORCE SENSOR

CROSS-REFERENCE TO RELATED APPLICATION

The present application claims priority from Japanese Patent Application No. 2013-040295 filed on Mar. 1, 2013, the entire contents of which are hereby incorporated by reference.

BACKGROUND OF THE INVENTION

1. Technical Field

The present invention relates to wheel operating force sensors for a vehicle such as an automobile, and more particularly to a sensor that is easily mounted on a vehicle, has a simple structure, can be easily manufactured, and does not require complex computational processing for output processing.

2. Related Art

Forward-rearward and axial forces acting upon a wheel, and moments about the axes are sometimes needed to be detected, for example, with the object of developing and evaluating an automobile and performing vehicle control. A five-component load cell capable of sensing, for example, forces acting along three orthogonal axial directions and moments about two axes orthogonal to the wheel axis direction, or a six-component force load cell additionally including a function of sensing a moment about the wheel axis have been suggested for measuring such a wheel operating force.

A structure in which strain gauges are attached to the surface of cross-shaped beams has been used as such a six-component force sensor.

Further, for example, Japanese Unexamined Patent Application Publication (JP-A) No. S61-79129 describes a six-component force sensor in which six strain gauges are provided at mutually independent positions in the circumferential direction on the circumferential surface of a thin-wall hollow cylindrical body, and the axial loads and axial bending moments created by forces applied between the two ends of the cylindrical body are calculated from the strain amount detected by each strain gauge.

However, a five-component force load cell having typical cross-shaped beams is difficult to dispose in an out-board fashion on the radially inner side of the rim for mounting a tire, and the input is usually measured at a point set apart from the axle center. Therefore, some computational formula for recalculating the input as a force acting upon the wheel and a signal processor for such calculations are required. Further, because of a complex structure of the load cell and the in-board disposition thereof, an insufficient mechanical strength can cause concerns and durability is difficult to ensure.

Further, the production process of such a load cell, such as mechanical processing of the beams and mounting of the strain gages on the surface thereof, is difficult, the process is unsuitable for mass production, and the cost thereof is high.

Meanwhile, the configuration can be possible in which a sensor such as a strain gauge is provided on an upright which is a member for attaching a hub unit in a vehicular suspension device, but such a configuration requires a computational unit and the accuracy is difficult to ensure.

As indicated in JP-A No. S61-79129, the load cell using a cylindrical sensing body can be mounted, for example, inside a hub unit. However, since the six-component force is calculated by computations with the output of six strain gauges, a signal processing device is still needed, and a device adapted for comparatively high load calculations is needed, in particular, to perform real-time computations.

SUMMARY OF THE INVENTION

With the above-described problems in view, it is an objective of the present invention to provide a wheel operating force sensor that is easily mounted on a vehicle, has a simple structure, can be easily manufactured, and does not require complex computational processing for output processing.

A first aspect of the present invention provides a wheel operating force sensor including: an attachment fixed to a vehicle body member supported by a suspension device; a hub to which a wheel is fixed and which is rotatably supported about a wheel axis with respect to the attachment; a sensing body having a tube formed substantially concentrically with the wheel axis, one end of the tube being fixed to the attachment, and the other end being connected to the hub, with a hub bearing being interposed between the other end and the hub; and a component force sensing unit having a bridge circuit including per component force at least four strain gauges that are provided on a circumferential surface of the tube of the sensing body. The hub bearing has: a radial bearing that is provided between the sensing body and the hub and receives a load in a radial direction; and a thrust bearing that is provided between the sensing body and the hub and receives a load in a thrust direction, and moreover provided separately from the radial bearing.

The radial bearing may be provided on a radially outer side of an end of the sensing body on the hub side, and the thrust bearing may be provided on a radially inner side of the end of the sensing body on the hub side.

The component force sensing unit may include a first radial component force sensing unit and a second radial component force sensing unit for detecting two component forces acting in the radial direction of the tube respectively, an axial component force sensing unit for detecting a component force acting in the axial direction of the tube, and a first radial-direction moment sensing unit and a second radial-direction moment sensing unit for detecting moments acting about two axes along the radial direction of the tube respectively. The first radial component force sensing unit, the second radial component force sensing unit, the first radial-direction moment sensing unit, and the second radial-direction moment sensing unit each may have a bridge circuit including first to fourth uniaxial strain gauges provided on the tube. The second uniaxial strain gauge may be disposed apart from the first uniaxial strain gauge in the center axis direction of the tube. The third uniaxial strain gauge and the fourth uniaxial strain gauge may be disposed at positions shifted by about 180 degrees about the center axis of the tube with respect to the second uniaxial strain gauge and the first uniaxial strain gauge, respectively. The axial component force sensing unit may have a bridge circuit including the first to fourth uniaxial strain gauges provided dispersedly and almost equidistantly in the circumferential direction of the tube.

The component force sensing unit may include an axial moment sensing unit for detecting a momentum acting about the axis of the tube, and the axial momentum sensing unit may have a bridge circuit including first to fourth shear-type strain gauges that are provided dispersedly and almost equidistantly in the circumferential direction of the tube.

The tube may be formed in a cylindrical shape, the inner diameter and outer diameter of which are substantially constant or change proportionally to a distance from one end.

A focal point of the component force sensing unit substantially may match the wheel center.

DETAILED DESCRIPTION

In accordance with the present invention, the objective of providing a wheel operating force sensor that is easily mounted on a vehicle, has a simple structure, can be easily manufactured, and does not require complex computational processing for output processing is attained by disposing the sensing body having a cylinder between the upright and the hub bearing, configuring a bridge circuit by providing four strain gauges per one component force on the surface of the cylinder, and configuring the hub bearing of the radial bearing and thrust bearing provided separately from each other.

EXAMPLES

A hub unit which is an example of the wheel operating force detection device using the present invention will be explained below.

Figure 1:
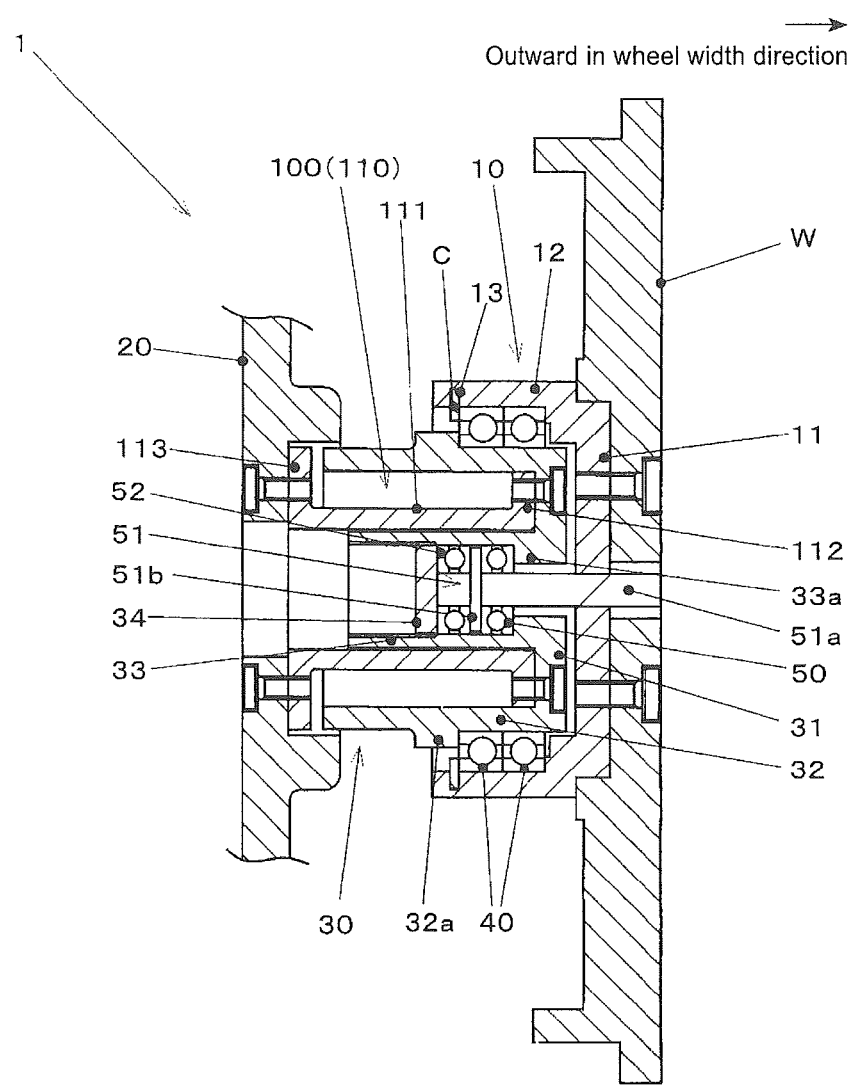
FIG. 1 illustrates a hub unit which is an example of a wheel operating force sensor using the present invention.

FIG. 1 is a cross-sectional view of the hub unit which is an example of the wheel operating force detection device using the present invention. This view is taken along the vertical plane including the wheel axis (rotation center axis of the wheel).

The hub unit of the present example fixes an upright (housing) supported at a tip of a suspension arm sliding with respect to a vehicle body and rotatably supports the wheel constituted by a tire and a rim in an automobile, for example, a passenger car.

For example, in the case of a strut-type suspension device the upright is fixed at the upper end to the lower end of the shell case of a shock absorber constituting the suspension strut and linked at the lower end to a lower arm by a ball joint or the like.

Where the suspension device is of a multilink or double-fishbone type, the upright is slidably linked by the upper end and lower end thereof to the upper arm and lower arm, respectively, and a trailing arm or the like is connected as necessary.

As shown in FIG. 1, a hub unit 1 is configured to have, for example, a hub 10, a hub unit fixing section 20, an input transmission section 30, a radial bearing 40, a thrust bearing 50, and a sensing body 110 of a six-component force detector 100.

A wheel W is fastened to the hub 10, and the hub rotates together with the wheel W.

The hub 10 is configured to have, for example, a disk section 11 and a cylinder 12.

The disk section 11 abuts against the surface of the wheel W on the inner side in the wheel width direction, and the wheel W is fixed thereto with fasteners such as bolts.

The disk section 11 is formed to be substantially concentric with the rotation center of the wheel W.

The cylinder 12 is formed to protrude inward in the wheel width direction from the outer circumferential edge of the disk section 11.

The cylinder 12 is formed to be substantially concentric with the rotation center of the wheel W.

An outer ring of the radial bearing 40 is inserted into and fixed to the radially inner side of the cylinder 12.

A circumferential ring 13 incorporating a C-ring C preventing the radial bearing 40 from falling off is formed in the inner circumferential surface of the cylinder 12.

An opening for inserting the below-described collar 51 is provided in the center of the wheel W and the disk section 11.

The hub unit fixing section 20 is a plate-shaped member fixed to the upright of a suspension device (not shown in the figure).

A second flange 113 of the sensing body 110 of the six-component force detector 100 is fixed to the hub unit fixing section 20 with a fastener such as a bolt.

The input transmission section 30 links the hub 10 and the sensing body 110 of the six-component force detector 100 through the radial bearing 40 and the thrust bearing 50.

The input transmission section 30 is configured to have, for example, an annular disk section 31, an outer tube 32, and an inner tube 33.

The annular disk section 31 is formed as a flat disk having a round opening concentric with an outer circumferential edge in the center.

A first flange 112 of the sensing body 110 of the six-component force detector 100 is fixed to the annular disk section 31 with a fastener such as a bolt.

The outer tube 32 is formed to protrude inward in the wheel width direction from the outer circumferential edge of the annular disk section 31.

The outer circumferential surface of the outer tube 32 is inserted into the inner ring of the radial bearing 40.

A flange 32a that abuts against the end, on the inner side in the wheel width direction, of the inner ring of the radial bearing 40 and ensures positioning thereof in the axial direction is formed at the outer circumferential surface of the outer tube 32.

The sensing body 110 of the six-component force detector 100 is inserted into the radially inner side of the outer tube 32.

The inner circumferential surface of the outer tube 32 is disposed opposite the outer circumferential surface of a cylinder 111 of the sensing body 110, with a gap being provided therebetween.

The inner tube 33 is formed to protrude inward in the wheel width direction from the inner circumferential edge of the annular disk section 31.

The inner tube 33 is inserted into the radially inner side of the sensing body 110 of the six-component force detector 100.

The outer circumferential surface of the inner tube 33 is disposed opposite the inner circumferential surface of the cylinder 111 of the sensing body 110, with a gap being provided therebetween.

A step 33a formed by reducing the diameter in a step-like fashion (overhangs on the radially inner side) and holding the thrust bearing 50 is formed at the end of the inner circumferential surface of the inner tube 33 on the outer side in the wheel width direction.

A fixing lid 34 is inserted into the radially inner side in the end of the thrust bearing 50, on the inner side in the wheel width direction, at the inner circumferential surface of the inner tube 33.

The fixing lid 34 is a disk-shaped member holding the thrust bearing 50, and an external thread formed at the outer circumferential surface of the fixing lid is engaged with the internal thread formed on the radially inner side of the inner tube 33.

The radial bearing 40 is a rolling bearing provided between the hub 10 and the input transmission section 30 and receives a radial load acting therebetween.

The radial bearing 40 is disposed on the radially outer side of the end of the sensing body 110 of the six-component force detector 100 on the outer side in the wheel width direction (hub 10 side).

For example, two single-row deep-groove ball bearings can be arranged and used as the radial bearing 40.

The outer ring of the radial bearing 40 is inserted into the radially inner side of the cylinder 12 of the hub 10, substantially fixed, and prevented by the C-ring C from falling off.

The outer ring of the radial bearing 40 rotates together with the hub 10 and the wheel W relative to the inner ring.

The outer tube 32 of the input transmission section 30 is inserted into the inner ring of the radial bearing 40 till the flange 32a abuts thereagainst and is substantially fixed therein.

The thrust bearing 50 is a rolling bearing provided between the hub 10 and the input transmission section 30 and receives a thrust load acting therebetween.

The thrust bearing 50 is disposed on the radially inner side of the end of the sensing body 110 of the six-component force detector 100 on the outer side in the wheel width direction.

For example, a thrust ball bearing can be used as the thrust bearing 50.

The thrust bearing 50 is inserted from the inner side, in the wheel width direction, into the radially inner side of the inner tube 33 of the input transmission section 30, and the end (track plate) on the outer side in the wheel width direction is disposed in a state of abutment against the step 33a and substantially fixed to the input transmission section 30.

The end (track plate) of the thrust bearing 50 on the inner side, in the wheel width direction, is held by the collar 51. The track plate rotates together with the hub 10 and the wheel W relatively to the other track plate.

The collar 51 is configured to have a shaft 51a and a flange 51b.

The shaft 51a is a shaft-shaped member disposed concentrically with the rotation center axis of the wheel W and is inserted into an opening formed in the center of the hub 10 and the center of the wheel W.

The flange 51b is a disk-shaped portion formed to protrude in a collar-like manner from the end of the shaft 51a on the inner side in the wheel width direction to the radially outer side.

The surface of the flange 51b on the outer side in the wheel width direction abuts against the end surface of the thrust bearing 50 on the inner side in the wheel width direction.

The end of the shaft 51a on the outer side in the wheel width direction is fastened to the hub 10 by a fastening unit such as a lock nut (not shown in the figure), and the tightening torque thereof applies a tensile force to the shaft 51a and preloads the thrust bearing 50.

Further, the surface of the flange 51b on the inner side in the wheel width direction is held by the fixing lid 34, with the thrust bearing 52 being interposed therebetween.

The thrust bearing 52 is sandwiched between the flange 51b and the fixing lid 34 and transmits a thrust force therebetween, while allowing the flange 51b and the fixing lid 34 to rotate relative to each other.

The six-component force detector 100 is configured to have the sensing body 110, which is formed in a substantially cylindrical shape and links the hub unit fixing section 20 and the input transmission section 30, a plurality of strain gauges provided at the sensing body 110, and a bridge circuit including the strain gauges.

Figure 2:
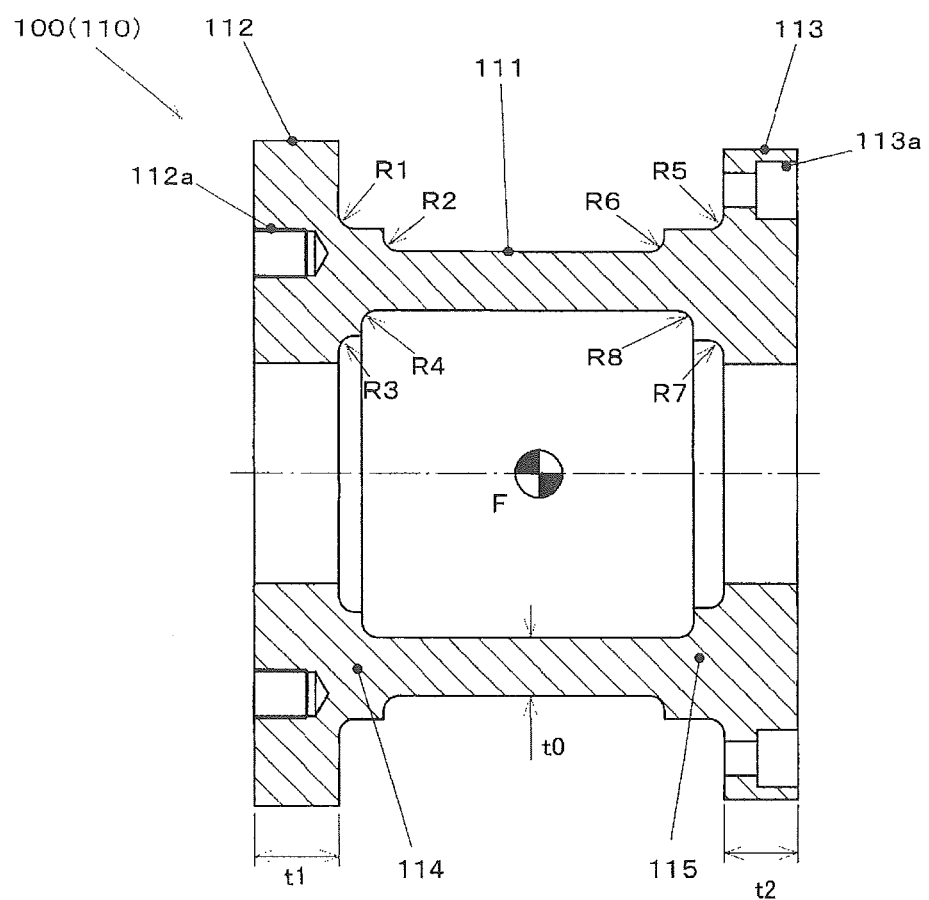
FIG. 2 is a cross-sectional view of the sensing body in the hub unit illustrated by FIG. 1, this view being taken along a plane including the center axis.

FIG. 2 is a cross-sectional view obtained by cutting the sensing body 110 of the six-component force detector 100 of the present example by a plane including the central axis.

As shown in FIG. 2, the sensing body 110 is formed to have, for example, a cylinder 111, a first flange 112, and a second flange 113.

The cylinder 111 is a portion formed in a cylindrical shape with substantially constant inner diameter and outer diameter over a predetermined length in the axial direction, and a plurality of the below-described strain gauges is pasted (bonded) thereto. The cylinder 111 is disposed substantially concentrically with the wheel axis.

The first flange 112 is a flat-plate portion provided at one end of the cylinder 111 and protruding to the radially outer side and radially inner side with respect to the cylinder 111.

The first flange 112 is to be fastened to the annular disk section 31 of the input transmission section 30, and a threaded hole 112a for fastening with a bolt is formed therein.

An intermediate section 114 is provided between the cylinder 111 and the first flange 112 and set such that the outer diameter and inner diameter thereof are intermediate therebetween. The outer circumferential surface of the intermediate section 114 is formed by increasing the diameter in a step-like fashion with respect to that of the outer circumferential surface of the cylinder 111. The inner circumferential surface of the intermediate section 114 is formed by decreasing the diameter in a step-like fashion with respect to that of the inner circumferential surface of the cylinder 111.

An R-section (R1) is provided between the end surface on the radially outer side of the first flange 112 on the second flange 113 side and the outer circumferential surface of the intermediate section 114.

An R-section (R2) is provided between the end surface on the radially outer side of the intermediate section 114 on the second flange 113 side and the outer circumferential surface of the cylinder 111.

An R-section (R3) is provided between the end surface on the radially inner side of the first flange 112 on the second flange 113 side and the inner circumferential surface of the intermediate section 114.

An R-section (R4) is provided between the end surface on the radially inner side of the intermediate section 114 on the second flange 113 side and the inner circumferential surface of the cylinder 111.

Among the above-described R sections (R1 to R4), R1 and R3 are disposed such that the positions thereof in the axial direction of the sensing body 110 practically match each other.

The positions of R2 and R4 in the axial direction of the sensing body 110 are disposed with an offset such that R2 is closer to the second flange 113.

The second flange 113 is a flat-plate portion provided at the end of the cylinder 111 on the side opposite that of the first flange 112 and formed to protrude to the radially outer side and radially inner side with respect to the cylinder 111.

The second flange 113 is to be fastened to the hub unit fixing section 20, and the bolt hole 113a for inserting a bolt is formed therein.

An intermediate section 115 is provided between the cylinder 111 and the second flange 113 and set such that the outer diameter and inner diameter thereof are intermediate therebetween. The outer circumferential surface of the intermediate section 115 is formed by increasing the diameter in a step-like fashion with respect to that of the outer circumferential surface of the cylinder 111. The inner circumferential surface of the intermediate section 115 is formed by decreasing the diameter in a step-like fashion with respect to that of the inner circumferential surface of the cylinder 111.

An R-section (R5) is provided between the end surface on the radially outer side of the second flange 113 on the first flange 112 side and the outer circumferential surface of the intermediate section 115.

An R-section (R6) is provided between the end surface on the radially outer side of the intermediate section 115 on the first flange 112 side and the outer circumferential surface of the cylinder 111.

An R-section (R7) is provided between the end surface on the radially inner side of the second flange 113 on the first flange 112 side and the inner circumferential surface of the intermediate section 115.

An R-section (R8) is provided between the end surface on the radially inner side of the intermediate section 115 on the first flange 112 side and the inner circumferential surface of the cylinder 111.

Among the above-described R sections (R5 to R8), R5 and R7 are disposed such that the positions thereof in the axial direction of the sensing body 110 practically match each other.

The positions of R6 and R8 in the axial direction of the sensing body 110 are disposed with an offset such that R6 is closer to the first flange 112.

The thickness t1 of the first flange 112 and the thickness t2 of the second flange 113 are set to be sufficiently larger than the thickness t0 of the cylinder 111.

The six-component force detector 100 has an Fx sensing system, an Fy sensing system, an Fz sensing system, an Mx sensing system, an My sensing system, and an Mz sensing system, each sensing system having a bridge circuit including a strain gauge provided at the cylinder 111 of the above-described sensing body 110.

The Fx sensing system detects a force Fx in the radial direction (referred to hereinbelow as x-axis direction) that acts upon the cylinder 111 of the above-described sensing body 110.

The Fy sensing system detects a force Fy in the radial direction (referred to hereinbelow as y-axis direction), which is orthogonal to the x-axis direction, that acts upon the cylinder 111 of the above-described sensing body 110.

The Fz sensing system detects a force Fz in the axial direction (referred to hereinbelow as z-axis direction) that acts upon the cylinder 111 of the above-described sensing body 110.

The Mx sensing system detects a moment Mx about the x-axis that acts upon the cylinder 111 of the above-described sensing body 110.

The My sensing system detects a moment My about the y-axis that acts upon the cylinder 111 of the above-described sensing body 110.

The Mz sensing system detects a moment Mz about the z-axis that acts upon the cylinder 111 of the above-described sensing body 110.

The above-described Fx sensing system, Fy sensing system, Fz sensing system, Mx sensing system, My sensing system, and Mz sensing system are each configured to have a bridge circuit including four strain gauges.

Figure 3:
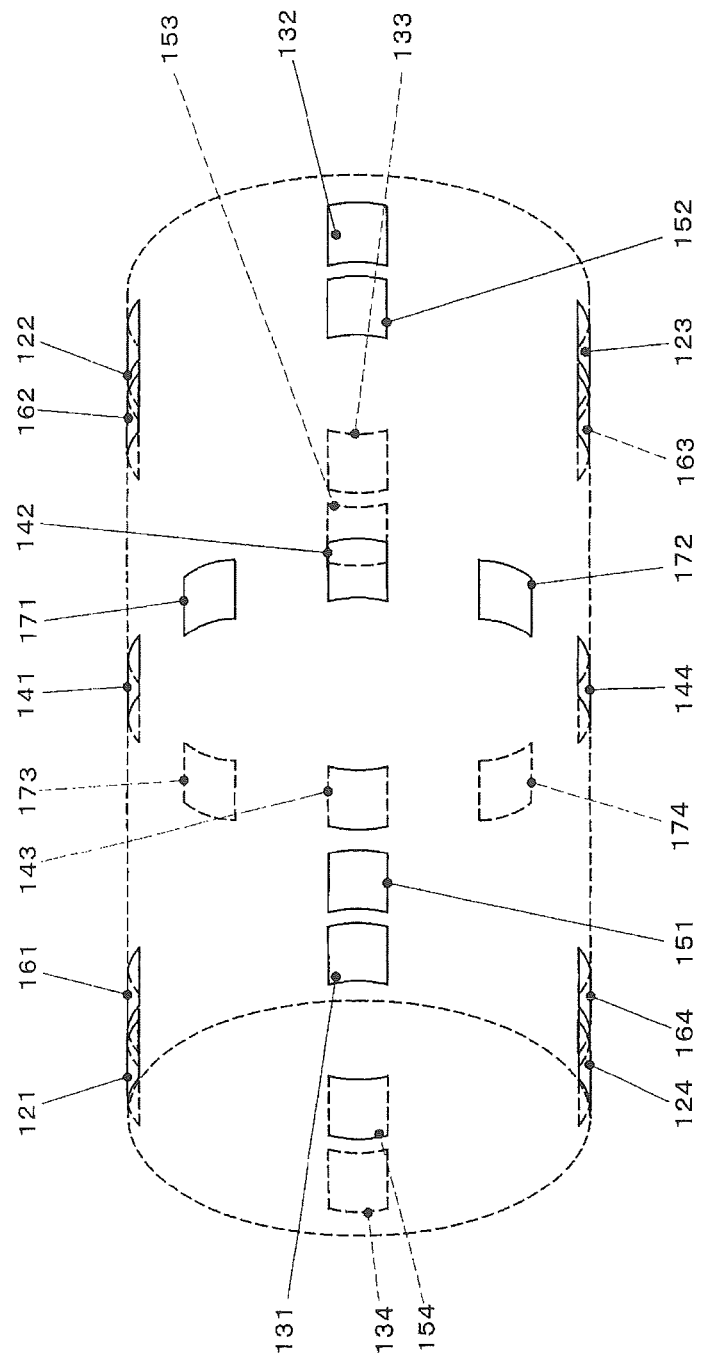
FIG. 3 is a schematic perspective view illustrating the disposition of the strain gauges provided at the sensing body illustrated by FIG. 2.

FIG. 3 is a schematic perspective view illustrating the disposition of the strain gauges in the six-component detection device of the present example.

Figure 4A:
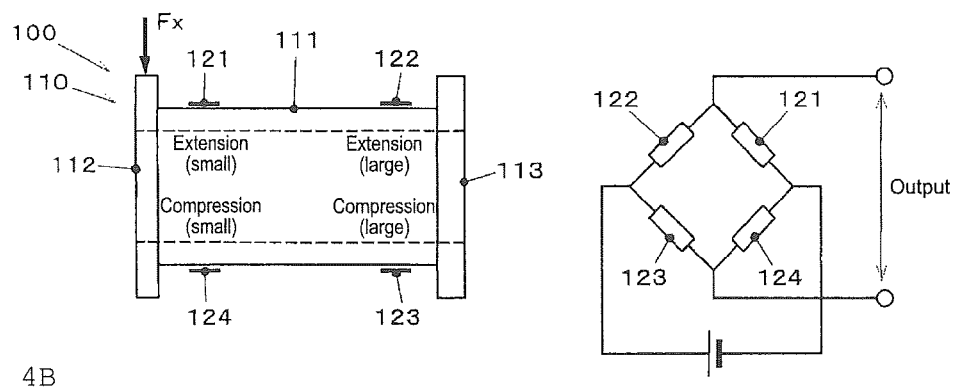
FIGS. 4A-4C illustrate the configuration of the bridge circuit of the force sensing system in the hub unit of the example.
Figure 4B:
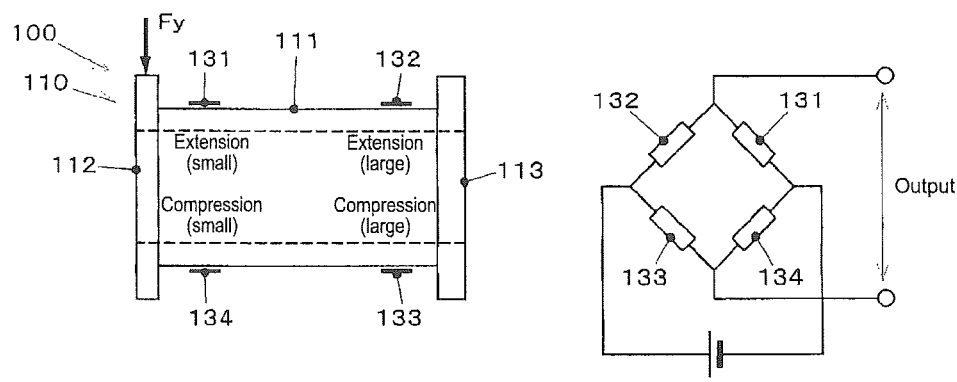
Figure 4C:
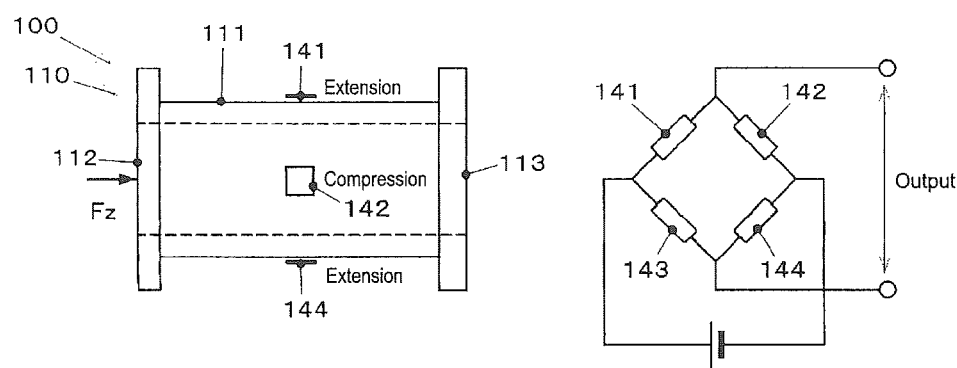

FIG. 4 illustrates the disposition of the strain gauges and the configuration of bridge circuits in the force sensing systems in the six-component detection device of the present example. FIGS. 4A, 4B, and 4C illustrate the Fx sensing system, Fy sensing system, and Fz sensing system, respectively.

FIG. 5 illustrates the configuration of bridge circuits in the moment sensing systems in the six-component detection device of the present example. FIGS. 5A, 5B, and 5C illustrate the Mx sensing system, My sensing system, and Mz sensing system, respectively.

In FIGS. 4 and 5, the intermediate sections 114 and 115, for example, are not shown.

As shown in FIGS. 3 and 4, the Fx sensing system is configured to have strain gauges 121 to 124. The strain gauges 121 to 124 are uniaxial strain gauges and are pasted to the outer circumferential surface of the cylinder 111 so that the detection directions thereof are parallel to the center axis direction of the cylinder 111.

The strain gauge 121 is disposed in a region (region in the proximity of the intermediate section 114) of the outer circumferential surface of the cylinder 111 on the first flange 112 side.

The strain gauge 122 is disposed on a straight line that passes through the strain gauge 121 and is parallel to the axial direction of the cylinder 111 and is disposed in a region (region in the proximity of the intermediate section 115) of the outer circumferential surface of the cylinder 111 on the second flange 113 side.

The strain gauge 123 is disposed at a position (position symmetrical to the strain gauge 122 with respect to the center axis of the cylinder 111) shifted by 180 degrees about the center axis of the cylinder 111, as viewed from the strain gauge 122.

The strain gauge 124 is disposed at a position (position symmetrical to the strain gauge 121 with respect to the center axis of the cylinder 111) shifted by 180 degrees about the center axis of the cylinder 111, as viewed from the strain gauge 121.

Further, as shown in FIG. 4A, in the bridge circuit of the Fx sensing system, the strain gauges 121 to 124 are sequentially connected in a loop, the positive electrode of a power supply is connected between the strain gauge 122 and the strain gauge 123, the negative electrode of the power supply is connected between the strain gauge 121 and the strain gauge 124, and the difference in potential between the strain gauge 121 and the strain gauge 122 and between the strain gauge 123 and the strain gauge 124 is extracted as an output.

The Fy sensing system is configured to have strain gauges 131 to 134. The strain gauges 131 to 134 are uniaxial strain gauges and are pasted on the outer circumferential surface of the cylinder 111 so that the detection directions thereof are parallel to the center axis direction of the cylinder 111.

The strain gauge 131 is disposed to be shifted by 90 degrees about the center axis of the cylinder 111 with respect to the strain gauge 121 of the Fx sensing system.

The strain gauge 132 is disposed to be shifted by 90 degrees about the center axis of the cylinder 111 with respect to the strain gauge 122 of the Fx sensing system.

The strain gauge 131 and the strain gauge 132 are disposed on the same line parallel to the axial line of the cylinder 111.

The strain gauge 133 is disposed at a position (position symmetrical to the strain gauge 132 with respect to the center axis of the cylinder 111) shifted by 180 degrees about the center axis of the cylinder 111, as viewed from the strain gauge 132.

The strain gauge 134 is disposed at a position (position symmetrical to the strain gauge 131 with respect to the center axis of the cylinder 111) shifted by 180 degrees about the center axis of the cylinder 111, as viewed from the strain gauge 131.

Further, as shown in FIG. 4B, in the bridge circuit of the Fy sensing system, the strain gauges 131 to 134 are sequentially connected in a loop, the positive electrode of a power supply is connected between the strain gauge 132 and the strain gauge 133, the negative electrode of the power supply is connected between the strain gauge 131 and the strain gauge 134, and the difference in potential between the strain gauge 131 and the strain gauge 132 and between the strain gauge 133 and the strain gauge 134 is extracted as an output.

The Fz sensing system is configured to have strain gauges 141 to 144. The strain gauges 141 to 144 are uniaxial strain gauges and are pasted on the outer circumferential surface of the cylinder 111 so that the detection directions thereof are parallel to the center axis direction of the cylinder 111.

The strain gauge 141 is disposed in the intermediate position between the strain gauges 121 and 122 of the Fx sensing system.

The strain gauges 142, 143, and 144 are disposed at positions shifted in phase by 90 degrees, 180 degrees, and 270 degrees about the center axis of the cylinder 111 with respect to the strain gauge 141.

Further, as shown in FIG. 4C, in the bridge circuit of the Fz sensing system, the strain gauges 141, 142, 144, and 143 are sequentially connected in a loop, the positive electrode of a power supply is connected between the strain gauge 141 and the strain gauge 143, the negative electrode of the power supply is connected between the strain gauge 142 and the strain gauge 144, and the difference in potential between the strain gauge 141 and the strain gauge 142 and between the strain gauge 143 and the strain gauge 144 is extracted as an output.

As shown in FIGS. 3 and 5, the Mx sensing system is configured to have strain gauges 151 to 154. The strain gauges 151 to 154 are uniaxial strain gauges and are pasted to the outer circumferential surface of the cylinder 111 so that the detection directions thereof are parallel to the center axis direction of the cylinder 111.

The strain gauge 151 is disposed adjacently, in the center axis direction of the cylinder 111, to the strain gauge 131 of the Fy sensing system.

The strain gauge 152 is disposed adjacently, in the center axis direction of the cylinder 111, to the strain gauge 132 of the Fy sensing system.

The strain gauge 151 and the strain gauge 152 are disposed on the same line parallel to the axial line of the cylinder 111.

The strain gauge 153 is disposed at a position (position symmetrical to the strain gauge 152 with respect to the center axis of the cylinder 111) shifted by 180 degrees about the center axis of the cylinder 111, as viewed from the strain gauge 152.

The strain gauge 154 is disposed at a position (position symmetrical to the strain gauge 151 with respect to the center axis of the cylinder 111) shifted by 180 degrees about the center axis of the cylinder 111, as viewed from the strain gauge 151.

Figure 5A:
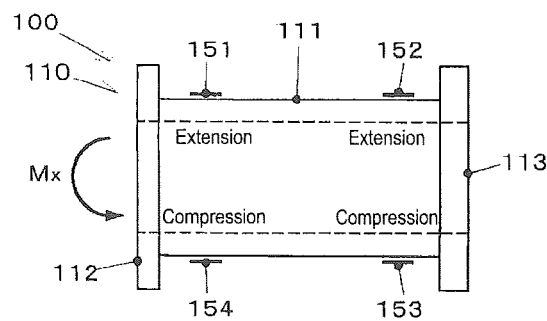
FIGS. 5A-5C illustrate the configuration of the bridge circuit of moment sensing system in the hub unit of the example.
Figure 5A:
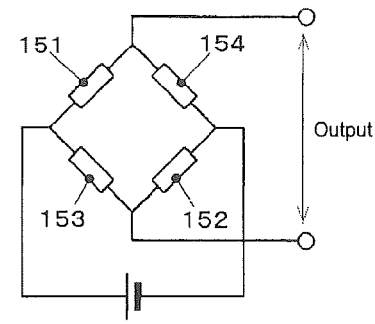

Further, as shown in FIG. 5A, in the bridge circuit of the Mx sensing system, the strain gauges 151, 153, 152, and 154 are sequentially connected in a loop, the positive electrode of a power supply is connected between the strain gauge 151 and the strain gauge 153, the negative electrode of the power supply is connected between the strain gauge 152 and the strain gauge 154, and the difference in potential between the strain gauge 151 and the strain gauge 154 and between the strain gauge 153 and the strain gauge 152 is extracted as an output.

The My sensing system is configured to have strain gauges 161 to 164. The strain gauges 161 to 164 are uniaxial strain gauges and are pasted to the outer circumferential surface of the cylinder 111 so that the detection directions thereof are parallel to the center axis direction of the cylinder 111.

The strain gauge 161 is disposed adjacently, in the center axis direction of the cylinder 111, to the strain gauge 121 of the Fx sensing system.

The strain gauge 162 is disposed adjacently, in the center axis direction of the cylinder 111, to the strain gauge 122 of the Fx sensing system.

The strain gauge 161 and the strain gauge 162 are disposed on the same line parallel to the axial line of the cylinder 111.

The strain gauge 163 is disposed at a position (position symmetrical to the strain gauge 162 with respect to the center axis of the cylinder 111) shifted by 180 degrees about the center axis of the cylinder 111, as viewed from the strain gauge 162.

The strain gauge 164 is disposed at a position (position symmetrical to the strain gauge 161 with respect to the center axis of the cylinder 111) shifted by 180 degrees about the center axis of the cylinder 111, as viewed from the strain gauge 161.

Figure 5B:
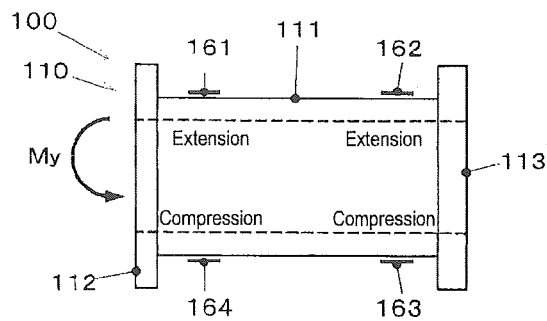
Figure 5B:
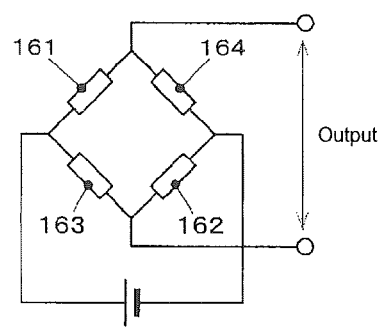

Further, as shown in FIG. 5B, in the bridge circuit of the My sensing system, the strain gauges 161, 163, 162, and 164 are sequentially connected in a loop, the positive electrode of a power supply is connected between the strain gauge 161 and the strain gauge 163, the negative electrode of the power supply is connected between the strain gauge 162 and the strain gauge 164, and the difference in potential between the strain gauge 161 and the strain gauge 164 and between the strain gauge 163 and the strain gauge 162 is extracted as an output.

The Mz sensing system is configured to have strain gauges 171 to 174. The strain gauges 171 to 174 are shear-shaped strain gauges and are pasted to the outer circumferential surface of the cylinder 111 so that the detection directions thereof are the circumferential direction of the cylinder 111.

The strain gauge 171 is disposed between the strain gauges 141 and 142 of the Fz sensing system.

The strain gauge 172 is disposed between the strain gauges 142 and 144 of the Fz sensing system.

The strain gauges 173 and 174 are disposed at positions symmetrical to the strain gauges 172 and 171, respectively, with respect to the center axis of the cylinder 111.

Figure 5C:
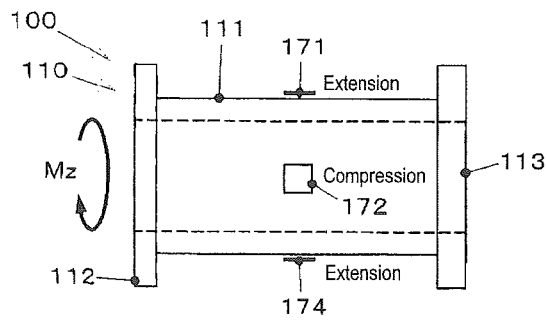
Figure 5C:
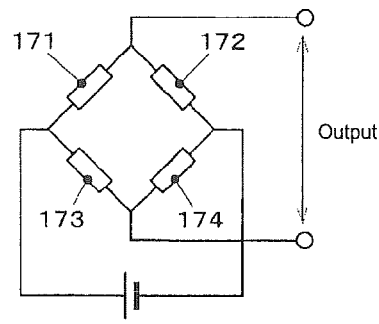

Further, as shown in FIG. 5C, in the bridge circuit of the Mz sensing system, the strain gauges 171, 173, 174, and 172 are sequentially connected in a loop, the positive electrode of a power supply is connected between the strain gauge 171 and the strain gauge 173, the negative electrode of the power supply is connected between the strain gauge 172 and the strain gauge 174, and the difference in potential between the strain gauge 171 and the strain gauge 172 and between the strain gauge 173 and the strain gauge 174 is extracted as an output.

The strain gauges of each of the above-described sensing systems are disposed such that the focal point F of each sensing system substantially matches the center (center in tire width direction on the wheel axis) of the wheel (not shown in the figure).

According to the example explained hereinabove, the following effects can be obtained.

(1) Since the six-component force detector 100, which is a load cell for measuring the component forces, is provided inside the hub unit 1, the hub unit 1 of the present example can be easily mounted on the vehicle by replacing the existing hub unit. Further, since the sensor can be disposed at a place in the vicinity of the wheel center, the output thereof can be directly used as a wheel operating force.

Further, the sensing body 110 can be formed comparatively easily, for example, by mechanical processing with a lath, and the strain gauges are mounted only on the surface side of the cylinder 111. Therefore, the processes of manufacturing the sensing body 110 and attaching the strain gauges can be simplified by comparison with those of the conventional six-component force sensor using, for example, cross-shaped beams as the sensing body, mass production can be realized, and the cost is reduced.

Further, the circuits can be formed integrally by printing.

(2) Since the radial bearing 40 is disposed on the radially outer side and the thrust bearing 50 is disposed on the radially inner side of the end of the sensing body 110 on the hub 10 side, the load is transmitted from the radially outer side and radially inner side of the sensing body 110, thereby making it possible to increase the load transmission efficiency and raise the detection sensitivity. Further, since bearings for general use which are conventional products can be used as the radial bearing 40 and the thrust bearing 50 and because sealing can be easily performed, the freedom of design, such as the freedom of selecting the bearings, is increased and the production can be facilitated.

(3) By using the symmetry of stress spots in the cylinder 111, it is possible to inhibit the mutual interference of component forces, balance the drift, make it unnecessary to perform signal processing computations of the bridge circuit output, and greatly simplify the structure of the signal processing system.

(4) The so-called single-focus configuration in which the central axes of all of the component forces and moments are collected in one point can be easily realized, the interference between the component forces is reduced, and compensation calculations are made unnecessary.

Further, as a result of substantially matching the focal point with the wheel center, the computational processing required due to the displacement between the measurement position and the wheel center is made unnecessary.

(5) By disposing the R sections R2, R4 between the cylinder 111 and the intermediate section 114 with an offset and by disposing the R sections R6, R8 between the cylinder 111 and the intermediate section 115 with an offset, it is possible to prevent the influence of, for example, the tightening torque created when the support section or input section is fixed to the first flange 112 and the second flange 113 from affecting the cylinder 111, and highly accurate detection of the six component forces can be performed.

(6) With such a configuration, as a result of detecting the moment about the wheel axis, in addition to the five component forces including the up-down, forward-rearward, and axial forces acting upon the wheel and the moments about the vertical axis and horizontal axes, the sensor can be used for measuring or compensating the rolling resistance and for failure detection.

Variation Example

The present invention is not limited to the above-described example and various changes and modifications can be made without departing from the technical scope of the present invention.

(1) The shape, structure, materials and arrangement or the like of the members constituting the hub unit can be changed as appropriate.

The types of the radial bearing and thrust bearing are not limited to those of the example, and bearings of other types may be used.

(2) In the example, the tube of the sensing body of the six-component force sensor is formed, for example, in a cylindrical shape having uniform outer diameter and inner diameters, but the present invention is not limited to such a configuration, and the sensing body may be, for example, a tapered tubular body in which the outer diameter and inner diameter change according to the axial distance. Further, the cross-sectional shape is not limited to the round shape and a polygonal cross-sectional shapes or other cross-sectional shapes may be also used.

(3) In the example, six component forces are detected, but the present invention is not limited to such a configuration, and a configuration in which only some component forces thereamong are detected may be also used. For example, a configuration in which five component forces are detected, the moment about the wheel axis being omitted, may be also used.

(4) The strain gauges used in each component force sensing system are not limited to the configuration constituted by a single strain gauge, and a set in which a plurality of strain gauges is connected in parallel or serial may be also used as a single strain gage. With such a configuration, for example the sensitivity can be increased.

(5) The presence/absence, dimensions and shape of the step provided at each end of the cylinder, and the settings of R at the boundaries are not limited to the above-described example and can be changed as appropriate.

(6) In the example, the strain gauges are pasted on the outer circumferential surface of the cylinder, but a configuration in which the strain gauges are pasted on the inner circumferential surface may be also used.

The invention claimed is:

1. A wheel operating force sensor comprising:
    an attachment fixed to a vehicle body member supported by a suspension device;
    a hub to which a wheel is fixed and which is rotatably supported about a wheel axis with respect to the attachment;
    a sensing body having a tube formed substantially concentrically with the wheel axis, one end of the tube being fixed to the attachment, and the other end being connected to the hub, with a hub bearing being interposed between the other end and the hub; and
    a component force sensing unit having a bridge circuit including per component force at least four strain gauges that are provided on a circumferential surface of the tube of the sensing body, wherein
    the hub bearing has:
    a radial bearing provided between the sensing body and the hub and receiving a load in a radial direction; and
    a thrust bearing provided between the sensing body and the hub and receiving a load in a thrust direction, and moreover provided separately from the radial bearing.

2. The wheel operating force sensor according to claim 1, wherein the radial bearing is provided on a radially outer side of an end of the sensing body on the hub side; and the thrust bearing is provided on a radially inner side of the end of the sensing body on the hub side.

3. The wheel operating force sensor according to claim 1, wherein the component force sensing unit includes a first radial component force sensing unit and a second radial component force sensing unit for detecting two component forces acting in the radial direction of the tube respectively, an axial component force sensing unit for detecting a component force acting in the axial direction of the tube, and a first radial-direction moment sensing unit and a second radial-direction moment sensing unit for detecting moments acting about two axes along the radial direction of the tube respectively;

the first radial component force sensing unit, the second radial component force sensing unit, the first radial-direction moment sensing unit, and the second radial-direction moment sensing unit each have a bridge circuit including first to fourth uniaxial strain gauges provided on the tube, the second uniaxial strain gauge is disposed apart from the first uniaxial strain gauge in the center axis direction of the tube, and the third uniaxial strain gauge and the fourth uniaxial strain gauge are disposed at positions shifted by about 180 degrees about the center axis of the tube with respect to the second uniaxial strain gauge and the first uniaxial strain gauge, respectively; and the axial component force sensing unit has a bridge circuit including the first to fourth uniaxial strain gauges provided dispersedly and almost equidistantly in the circumferential direction of the tube.

4. The wheel operating force sensor according to claim 2, wherein the component force sensing unit includes a first radial component force sensing unit and a second radial component force sensing unit for detecting two component forces acting in the radial direction of the tube respectively, an axial component force sensing unit for detecting a component force acting in the axial direction of the tube, and a first radial-direction moment sensing unit and a second radial-direction moment sensing unit for detecting moments acting about two axes along the radial direction of the tube respectively;

the first radial component force sensing unit, the second radial component force sensing unit, the first radial-direction moment sensing unit, and the second radial-direction moment sensing unit each have a bridge circuit including first to fourth uniaxial strain gauges provided on the tube, the second uniaxial strain gauge is disposed apart from the first uniaxial strain gauge in the center axis direction of the tube, and the third uniaxial strain gauge and the fourth uniaxial strain gauge are disposed at positions shifted by about 180 degrees about the center axis of the tube with respect to the second uniaxial strain gauge and the first uniaxial strain gauge, respectively; and the axial component force sensing unit has a bridge circuit including the first to fourth uniaxial strain gauges provided dispersedly and almost equidistantly in the circumferential direction of the tube.

5. The wheel operating force sensor according to claim 3, wherein the component force sensing unit includes an axial moment sensing unit for detecting a momentum acting about the axis of the tube; and the axial momentum sensing unit has a bridge circuit including first to fourth shear-type strain gauges that are provided dispersedly and almost equidistantly in the circumferential direction of the tube.

6. The wheel operating force sensor according to claim 4, wherein the component force sensing unit includes an axial moment sensing unit for detecting a momentum acting about the axis of the tube; and the axial momentum sensing unit has a bridge circuit including first to fourth shear-type strain gauges that are provided dispersedly and almost equidistantly in the circumferential direction of the tube.

7. The wheel operating force sensor according to claim 1, wherein the tube is formed in a cylindrical shape, the inner diameter and outer diameter of which are substantially constant or change proportionally to a distance from one end.

8. The wheel operating force sensor according to claim 2, wherein the tube is formed in a cylindrical shape, the inner diameter and outer diameter of which are substantially constant or change proportionally to a distance from one end.

9. The wheel operating force sensor according to claim 3, wherein the tube is formed in a cylindrical shape, the inner diameter and outer diameter of which are substantially constant or change proportionally to a distance from one end.

10. The wheel operating force sensor according to claim 4, wherein the tube is formed in a cylindrical shape, the inner diameter and outer diameter of which are substantially constant or change proportionally to a distance from one end.

11. The wheel operating force sensor according to claim 5, wherein the tube is formed in a cylindrical shape, the inner diameter and outer diameter of which are substantially constant or change proportionally to a distance from one end.

12. The wheel operating force sensor according to claim 6, wherein the tube is formed in a cylindrical shape, the inner diameter and outer diameter of which are substantially constant or change proportionally to a distance from one end.

13. The wheel operating force sensor according to claim 1, wherein a focal point of the component force sensing unit substantially matches the wheel center.

14. The wheel operating force sensor according to claim 2, wherein a focal point of the component force sensing unit substantially matches the wheel center.

15. The wheel operating force sensor according to claim 3, wherein a focal point of the component force sensing unit substantially matches the wheel center.

16. The wheel operating force sensor according to claim 4, wherein a focal point of the component force sensing unit substantially matches the wheel center.

17. The wheel operating force sensor according to claim 5, wherein a focal point of the component force sensing unit substantially matches the wheel center.

18. The wheel operating force sensor according to claim 6, wherein a focal point of the component force sensing unit substantially matches the wheel center.

* * * * *